United States Patent
Miyashiro et al.

(10) Patent No.: US 8,303,917 B2
(45) Date of Patent: Nov. 6, 2012

(54) SYSTEM AND METHOD FOR PRODUCING HYDROGEN FROM SEAWATER

(76) Inventors: Tomonao Miyashiro, Kanagawa (JP); Kousaku Mabuchi, Kumamoto (JP); Masaharu Takao, Fukuoka (JP)

( * ) Notice: Subject to any disclaimer, the term of this patent is extended or adjusted under 35 U.S.C. 154(b) by 773 days.

(21) Appl. No.: 11/990,818

(22) PCT Filed: Aug. 22, 2005

(86) PCT No.: PCT/JP2005/015192
§ 371 (c)(1), (2), (4) Date: Feb. 21, 2008

(87) PCT Pub. No.: WO2007/023514
PCT Pub. Date: Mar. 1, 2007

(65) Prior Publication Data
US 2009/0246121 A1 Oct. 1, 2009

(51) Int. Cl.
*B01J 8/00* (2006.01)
(52) U.S. Cl. .......................... 422/608; 422/187; 422/242
(58) Field of Classification Search ................. 422/187, 422/242, 608; 423/652
See application file for complete search history.

(56) References Cited

U.S. PATENT DOCUMENTS

| | | | |
|---|---|---|---|
| 3,901,669 A | 8/1975 | Seitzer | |
| 4,124,628 A * | 11/1978 | McRobbie | 518/708 |
| 4,256,146 A * | 3/1981 | Genini et al. | 138/111 |
| 4,619,670 A * | 10/1986 | Malcolm et al. | 96/27 |

FOREIGN PATENT DOCUMENTS

| | | |
|---|---|---|
| JP | 57-149802 A | 9/1982 |
| JP | 2004-115326 | 4/2004 |
| JP | 2004-115335 A | 4/2004 |
| WO | WO 00/65679 A1 | 11/2000 |

\* cited by examiner

*Primary Examiner* — Paul Wartalowicz
(74) *Attorney, Agent, or Firm* — Weingarten, Schurgin, Gagnebin & Lebovici LLP

(57) ABSTRACT

A hydrogen producing system and a hydrogen producing method by which hydrogen can be efficiently produced using abundant seawater as the raw material. A hydrogen producing method has a system (10) for producing hydrogen from seawater, and the hydrogen producing system (10) has an activation device (12) and a pipe line device (14). The activation device (12) has a closed space (S) for introducing the seawater (W) and a vapor ejection means (18) for ejecting high-temperature, high-pressure vapor (T) into the closed space (S), and the activation device (12) activates under high temperature and high pressure the seawater (W) in the closed space (S). The pipe line device (14) is a device for receiving and leading the high-temperature, high-pressure seawater activated by the activation device (12) and includes one or more seawater leading tubes (403-408) having any one of triangular, pentagonal, hexagonal and octagonal cross sections.

6 Claims, 4 Drawing Sheets

SYSTEM AND METHOD FOR PRODUCING HYDROGEN FROM SEAWATER

This application is a §371 national phase filing of PCT/JP2005/015192 filed Aug. 22, 2005.

FIELD OF ART

The present invention relates to a hydrogen producing system and method using seawater as a starting material and capable of expecting efficient production of hydrogen.

BACKGROUND ART

Hydrogen is used widely in various fields, including chemistry, chemicals, electricity, metal, and glass industry. Since hydrogen produces only water as waste, attention has recently been paid to hydrogen as a clean energy which replaces fossil fuel. For example, research and development are being made for the application of hydrogen to hydrogen-fuel cells, hydrogen-fueled vehicles, etc. Thus, a large amount of hydrogen will be utilized in the future. As conventional hydrogen producing methods there are known, for example, a method of producing hydrogen by electrolyzing water (electrolyte) and a method of producing hydrogen by modifying a hydrocarbon fuel gas such as natural gas (see, for example, Patent Document 1).

Patent Document 1:
Japanese Patent Laid-Open Publication No. 2004-115326

DISCLOSURE OF THE INVENTION

Problems to be Solved by the Invention

In the conventional electrolytic method, however, a large amount of electric power is consumed for the production of hydrogen, thus giving rise to problems such that the manufacturing efficiency is poor, the cost of hydrogen is high, and the mass production of hydrogen is not economical. There also is an attempt of producing hydrogen by the electrolysis of seawater which is present abundantly on the earth. However, various problems are encountered in the present situation. For example, the production efficiency is poor as mentioned above and an impurity removing process is necessary. Thus, the aforesaid attempt has not reached a practical level yet.

On the other hand, according to the hydrogen producing method described in Patent Document 1, for example as in the following formulae (i) and (ii), a hydrocarbon compound, e.g., natural gas (methane gas), is reacted with high-temperature steam of several hundred or higher degrees in the presence of a catalyst to produce hydrogen.

[Formula 1]

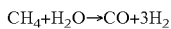

$$CH_4 + H_2O \rightarrow CO + 3H_2 \quad (i)$$

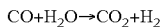

$$CO + H_2O \rightarrow CO_2 + H_2 \quad (ii)$$

However, in the hydrogen producing method described in Patent Document 1, as shown in the above formulae, carbon monoxide and carbon dioxide gases are produced as by-products in the course of production of hydrogen and thus there has been a problem in point of environment. There also has been a fear of resource exhaustion of natural gas used as a starting material.

The present invention has been accomplished in view of the above-mentioned conventional problems and it is an object of the invention to provide a hydrogen producing system and method using seawater as a starting material which is present abundantly and capable of expecting efficient production of hydrogen. It is another object of the present invention to provide a hydrogen producing system and method with reduced by-production of carbon monoxide and carbon dioxide gases and hence superior in point of environment.

Means for Solving the Problems

For solving the above-mentioned problems, the present invention is constituted by a hydrogen producing system 10 for producing hydrogen from seawater, the hydrogen producing system 10 comprising an activating apparatus 12 for activating seawater W present within a sealed space S at a high temperature and a high pressure, the activating apparatus 12 having the sealed space S for admitting seawater W therein and steam injection means (18) for injection of high-temperature, high-pressure steam T into the sealed space S, and a duct apparatus 14 for receiving and passing the high-temperature, high-pressure seawater activated in the activating apparatus 12, the duct apparatus 14 including one or plural seawater pipes 40 (403, 405, 406, 408) each having a section of any of the shapes of a triangle, a pentagon, a hexagon and an octagon. It is preferable that the sectional shape of the seawater pipes 40 be a regular triangle, a regular pentagon, a regular hexagon, or a regular octagon, each being equal in length of all sides. Even a pipe having a sectional shape whose sides are different in length will do as well.

Parallel pipe units 42a to 42b may be constituted by the seawater pipes 40 (403 to 408), in which the seawater pipes are arranged and supported in parallel through support means 44 so that their longitudinal axes (X) are parallel to one another and their pipe ends are flush with one another. The seawater pipes 403 to 408 may be arranged so that when seen from their pipe end side, central points (axes) X of their sectional shapes are aligned with one another longitudinally or transversely, or may be arranged longitudinally and transversely in a regular or irregular manner.

Plural parallel pipe units (42a, 42b, 42c, 42d, 42e) different in any or plural factors of sectional shape P, size R, the number Q and position (X) of the seawater pipes 40 may be connected in cascade so that the seawater pipes arranged in a line are put in longitudinal communication with one another in a state in which their interiors are sealed from the exterior. All of parallel pipe units may be provided so as to be different in the above factors respectively, but it suffices for at least interconnected parallel pipe units to be different in the factors. For example, in case of connecting three parallel pipe units 42a, 42b and 42c, the first and the third parallel pipe units 42a, 42c may be provided so as to be constituted by just the same factors and only the second parallel pipe unit 42b may be provided so as to be different in the construction of factors from the first and the third parallel pipe units. The number of parallel pipe units to be connected in cascade may be arbitrary. The seawater pipes arranged in a line need not always be connected so as to be in 1:1 communication. For example, one seawater pipe may be connected in communication longitudinally with plural seawater pipes.

The seawater pipes 40 may be connected in longitudinal communication with one another in a state in which the respective central axes X of the pipes are off-center from one another.

According to the present invention there also is provided a hydrogen producing method for producing hydrogen from seawater, which method comprises injecting high-temperature, high-pressure steam T into seawater W introduced into a sealed space S, thereby activating the seawater W while maintaining the interior of the sealed space S at a high temperature and a high pressure, and feeding the activated seawater under pressure into a plurality of seawater pipes of a duct apparatus 14 through a pressure feed mechanism 34, the duct apparatus 14 comprising the plural seawater pipes 403, 405, 406 and 408 each having a section of any of the shapes of a triangle, a pentagon, a hexagon and an octagon, the seawater pipes 403, 405, 406 and 408 being arranged in parallel so that their longitudinal axes (X) are parallel to one another.

Effects of the Invention

The hydrogen producing system using seawater according to the present invention is of a construction comprising an activating apparatus for activating seawater present within a sealed space at a high temperature and a high pressure, the activating apparatus having the sealed space for admitting seawater therein and steam injection means for injection of high-temperature, high-pressure steam into the sealed space, and a duct apparatus for receiving and passing the high-temperature, high-pressure seawater activated in the activating apparatus, the duct apparatus including one or plural seawater pipes each having a section of any of the shapes of a triangle, a pentagon, a hexagon and an octagon. According to this construction it is possible to implement a hydrogen producing system capable of efficiently producing a large amount of hydrogen directly from seawater. Besides, less system operation energy than in the conventional electrolytic method suffices and hence it is possible to reduce the manufacturing cost per unit production volume. Moreover, the production of hydrogen can be carried out in a clean environment without the generation of any greenhouse gas, e.g., carbon dioxide, as a by-product in hydrogen manufacture.

Moreover, by constituting parallel pipe units with use of the seawater pipes which parallel unit pipes are arranged and supported through support means so that their longitudinal axes are parallel to one another and their pipe ends are flush with one another, it is possible to improve the efficiency of hydrogen generation.

Moreover, by adopting the construction wherein plural pipe units different in any or plural factors of sectional shape, size, the number of pipes and position of the seawater pipes are connected in cascade so that the seawater pipes arranged in a line are put in longitudinal communication with one another in a state in which their interiors are sealed from the exterior, a large amount of hydrogen can be produced in a more efficient manner.

By adopting the construction wherein the seawater pipes are connected in longitudinal communication with one another in a state in which the respective central axes of the pipes are off-center from one another, a large amount of hydrogen can be produced in a more efficient manner without greatly complicating the system configuration.

In the hydrogen producing method using seawater according to the present invention, high-temperature, high-pressure steam is injected into seawater introduced into a sealed space to activate the seawater while maintaining the interior of the sealed space at a high temperature and a high pressure and the activated seawater is fed under pressure into a plurality of seawater pipes of a duct apparatus through a pressure feed mechanism, the duct apparatus comprising the plural seawater pipes each having a section of any of the shapes of a triangle, a pentagon, a hexagon and an octagon, the seawater pipes being arranged in parallel so that their longitudinal axes are parallel to one another. According to this construction, a large amount of hydrogen can be efficiently produced directly from seawater. Further, the production of hydrogen can be carried out cleanly because there is not produced any greenhouse gas, e.g., carbon dioxide, as a by-product.

EXPLANATION OF REFERENCE NUMERALS

Figure 1:
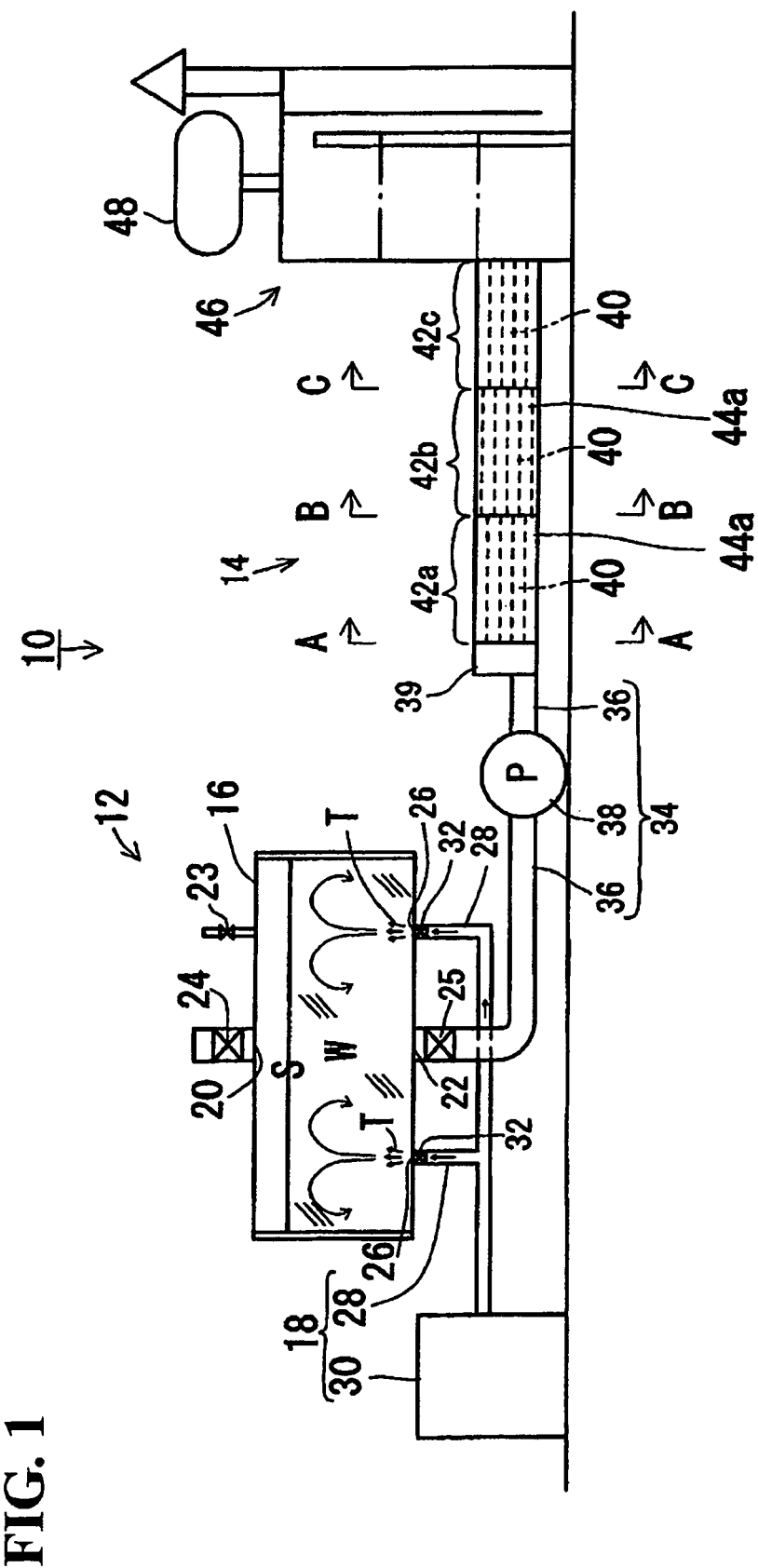
FIG. 1 is a schematic explanatory diagram of a system and method for producing hydrogen from seawater according to an embodiment of the present invention.

10 hydrogen producing system
12 activating apparatus
14 duct apparatus
18 steam injection device
40 (403, 405, 406, 408) seawater pipe
42$a$, 42$b$, 42$c$, 42$d$, 42$e$ parallel pipe unit
44 support means

BEST MODES FOR CARRYING OUT THE INVENTION

With reference to the accompanying drawings, a description will be given about a system and a method for producing hydrogen from seawater according to embodiments of the present invention. The hydrogen producing system using seawater according to the present invention produces hydrogen directly from seawater as a starting material. FIGS. 1 through 7 illustrates a hydrogen producing system using seawater according to the embodiments of the present invention. As shown in FIG. 1, the hydrogen producing system of this embodiment, indicated at 10, includes an activating apparatus 12 for activating seawater W at a high temperature and a high pressure and a duct apparatus 14 for receiving and passing the activated high-temperature, high-pressure seawater.

In this embodiment, the activating apparatus 12 is a first treating means which ejects high-temperature, high-pressure steam to the seawater W, thereby imparting energy to the seawater W to bring the seawater into a highly reactive activated state. In this embodiment, as shown in FIG. 1, the activating apparatus 12 is provided with a sealed tank 16 having a sealed space S in the interior thereof and a steam injection device 18 for injecting high-temperature, high-pressure steam into the sealed space S. For example, the sealed tank 16 is constituted by a hollow cylindrical body lying on its side and closed at both ends thereof and formed of metal resistant to heat, pressure and corrosion, e.g., stainless steel. The hollow interior of the sealed tank is sealed and serves as the sealed space S, into which seawater W as raw water is introduced. The sealed tank 16 is disposed at a certain height from the ground and is supported by support legs 19. In an upper portion of the sealed tank 16 is formed an inlet port 20 for introducing seawater into the sealed space S, while in a lower portion of the sealed tank 16 is formed a drain port 22 for draining the activated seawater W. The inlet port 20 and the drain port 22 are provided with opening/closing valves 24 and 25, respectively, so as to be opened and closed freely. With those ports closed, the sealed space S is kept sealed. In FIG. 1, the numeral 23 denotes a safety valve for preventing the internal pressure of the sealed space S from rising beyond a predetermined level.

The steam injection device 18 is a steam injection means for injecting high-temperature, high-pressure steam T into the sealed space S to treat the seawater present within the sealed space into a state of high temperature and high pressure. In this embodiment, the steam injection device 18 includes steam injection pipes 28, the steam injection pipes 28 each having a nozzle 26 within the sealed space S and being connected to the sealed tank 16, and a boiler 30 as a steam generator for supplying high-temperature, high-pressure steam to the steam injection pipes 28. The steam injection pipes 28 are attached to a lower surface side of the sealed tank 16 in such a manner that the nozzles 26 face upward within the sealed space S. The steam jetted from the nozzles 26, by virtue of its jetting force, agitates the seawater W present within the sealed space S while blowing up the seawater. That is, the steam jetted from the steam injection pipes 28 also serves as an agitator means which agitates the seawater by virtue of its jetting force, thereby promoting activation of the seawater. In this embodiment, the steam jetted from the steam injection pipes 28 is set, for example, at a temperature of 180 to 300° C. and a pressure of 15 to 30 atm. Near the nozzles of the steam injection pipes 28 are disposed check valves 32 for preventing reverse flow of the seawater from the tank. For maintaining a constant internal temperature and pressure of the sealed space in the sealed tank, there may be used sensors or a controller which controls opening and closing of the valves.

By treating seawater with high-temperature, high-pressure steam in the activating apparatus 12, there occurs, for example, an ultra-high temperature/pressure region (several thousand degrees, several thousand atm.) locally, whereby the seawater is activated. Or the seawater is activated due to the resulting neutrinos. It has been confirmed that in the case of freshwater, atomic transmutation occurs in the activating apparatus 12 and mineral components such as, for example, calcium and iron increase. For example, it is presumed that in the activating apparatus 12 water-containing components undergo such atomic transmutation as the following formulae (a) to (e):

[Formula 2]

(a)

(b)

(c)

(d)

(e)

Thus, it is presumed that also in the case of seawater there occurs a similar atomic transmutation with consequent increase of specific mineral components. Further, it is presumed that the activated high-temperature, high-pressure seawater obtains heat energy from steam and assumes a state of high internal energy, resulting in occurrence of not only such an atomic transmutation as shown in the above formulae but also a chemical reaction such as radical reaction, permitting easy generation of radicals (e.g., H•, OH•) and electrons, and thus the seawater is in a highly reactive state.

In this embodiment, as shown in FIG. 1, the high-temperature, high-pressure seawater activated in the activating apparatus 12 is fed under pressure to the duct apparatus 14 to be described later through a pressure feed mechanism 34. In this embodiment, the pressure feed mechanism 34 includes a connecting pipe 36 for connecting the drain port of the sealed tank 16 and on end side of the duct apparatus 14 with each other and a pressure pump 38 interposed in an intermediate position of the connecting pipe. In this embodiment, the pressure pump 38 feeds the seawater to the duct apparatus 14 under a high pressure of, say, about 40 to 50 atm.

Figure 2:
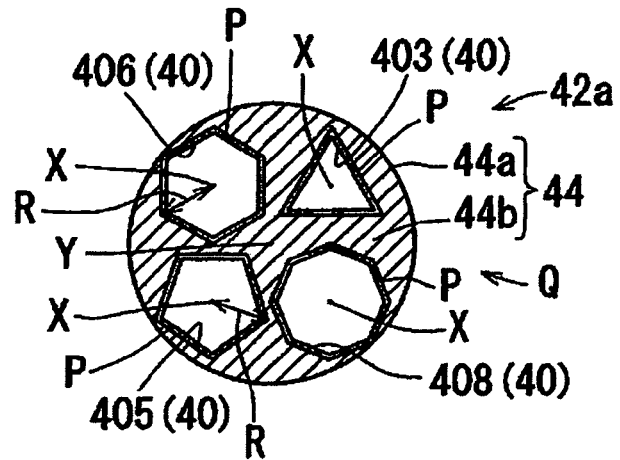
FIG. 2 is a sectional explanatory diagram taken on line A-A in FIG. 1.
Figure 3:
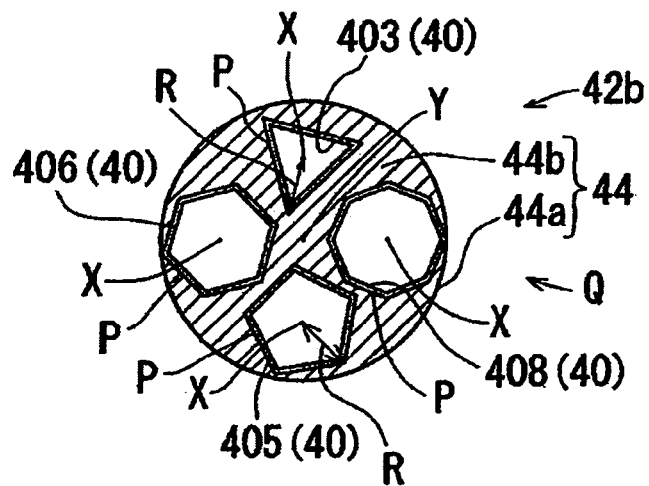
FIG. 3 is a sectional explanatory diagram taken on line B-B in FIG. 1.
Figure 4:
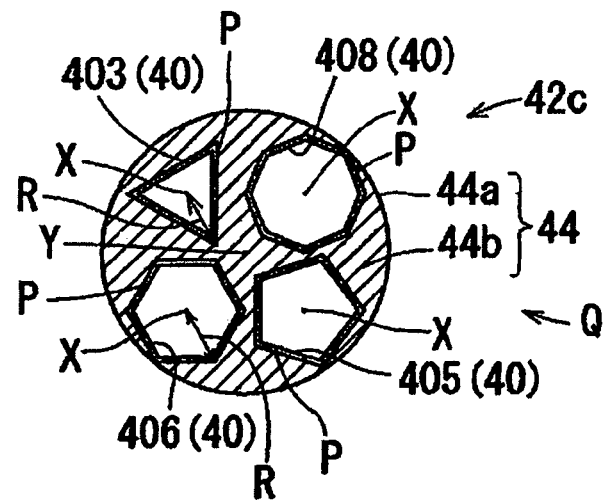
FIG. 4 is a sectional explanatory diagram taken on line C-C in FIG. 1.

As shown in FIGS. 2, 3 and 4, the duct apparatus 14 is provided with plural seawater pipes 40 each having a section P of any of the shapes of a triangle, a pentagon, a hexagon and an octagon. In this embodiment, as also shown in FIG. 1, the duct apparatus 14 is constituted as a whole by a cylindrical body with a longitudinal axis disposed horizontally. The plural seawater pipes 40 are disposed in the interior of the cylindrical body. The high-temperature, high-pressure seawater activated in the activating apparatus 12 is allowed to flow at a high pressure from one end side toward the opposite end side of the duct apparatus 14. It is presumed that when the activated seawater flows through the seawater pipes 40 in the duct apparatus 14, the water molecule ($H_2O$) contained in the seawater undergoes high energy developed locally resulting in separation and formation of hydrogen ($H_2$). More particularly, the duct apparatus 14 constitutes a main hydrogen production portion in the hydrogen producing system of this embodiment. It has been confirmed that a large amount of hydrogen is produced by allowing seawater to flow through such specific pipes of a triangular, pentagonal, hexagonal or octagonal sectional shape P as referred to above. It is therefore presumed that a high energy site for separating and producing hydrogen from seawater is easy to be developed within the pipes of such a sectional shape.

In this embodiment, as shown in FIG. 1, the duct apparatus 14 is divided into three blocks (42a, 42b, 42c) in the longitudinal direction. The three blocks are constituted respectively by first to third parallel pipe units 42a to 42c each comprising plural seawater pipes 40 which are arranged side by side so that their longitudinal axes are parallel to one another. The first to the third parallel pipe units are connected in cascade in the longitudinal direction.

Figure 8:
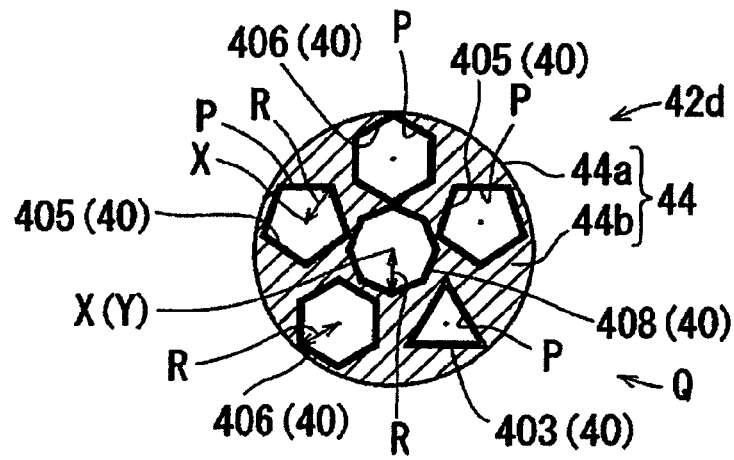
FIG. 8 is a sectional explanatory diagram of a parallel pipe unit of different constituent elements according to an embodiment of the present invention.
Figure 9:
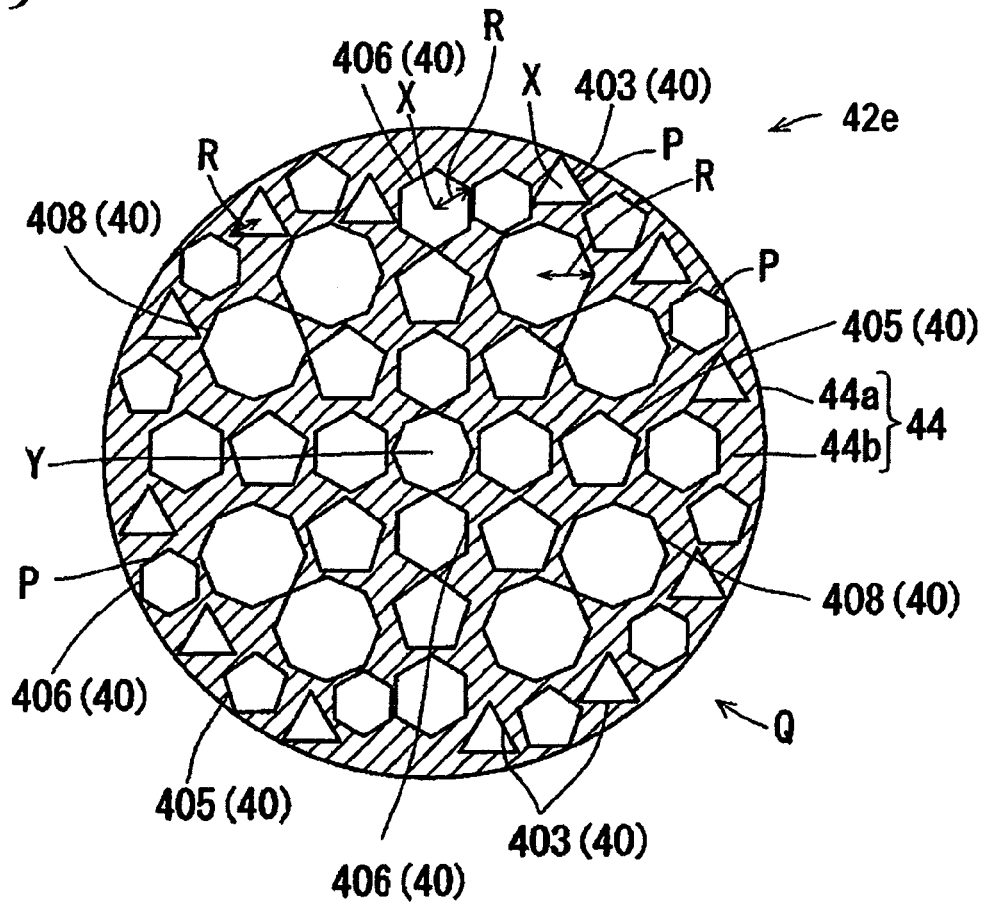
FIG. 9 is a sectional explanatory diagram of a parallel pipe unit of different constituent elements according to another embodiment of the present invention.

In FIG. 2, the first parallel pipe unit 42a has four pipes as the number Q of pipes which are a seawater pipe 403 having a sectional shape P of a regular triangle, a seawater pipe 405 having a sectional shape P of a regular pentagon, a seawater pipe 406 having a sectional shape P of a regular hexagon, and a seawater pipe 408 having a sectional shape P of a regular octagon. In this embodiment, the seawater pipes 403 to 408 are each constituted by a straight pipe member formed in a certain sectional shape P in the direction of its longitudinal axis. For example, the seawater pipes 403 to 408 are formed of metal having resistance to heat, pressure and corrosion such as stainless steel. All the seawater pipes 403 to 408 are of the same length and are arranged so that their longitudinal axes are parallel to one another (in the transverse direction in FIG. 1 or in the direction perpendicular to the paper surface in FIG. 2). As shown in FIG. 2, the seawater pipes 403 to 408 are arranged so that, for example when seen from their end opening side, central points (pipe center axes) of their sectional shapes P are regularly (or irregularly) arranged longitudinally and transversely. The seawater pipes 403 to 408 are supported through support means 44 so as to be flush with one another at each end. In this embodiment, the support means 44 is provided with an outer cylindrical body 44a made of stainless steel which covers the juxtaposed seawater pipes so as to bundle the pipes from the outside and closure lids 44b made of stainless steel and fixed to both ends of the outer cylindrical body 44a. The closure lids 44b not only fixedly support both ends of the seawater pipes but also close the other portion (shaded area in FIG. 2) than pipe openings. Although in FIG. 2 the outer cylindrical body 44 is cylindrical in section, this constitutes no limitation. The outer cylindrical body 44 may be of any other cylindrical shape. For example, its sectional shape may be tetragonal, pentagonal, or hexagonal. The support means 44 is not limited to a cylindrical body. There may be any other support member, including a frame. Bodies of plural seawater pipes may be fixed together by welding for example to support their juxtaposed state. Any other support structure may be adopted insofar as it can support plural pipes arranged in parallel. In this embodiment, the first parallel pipe unit 42a is connected to the connecting pipe 36 in the pressure feed mechanism through a buffer portion 39, so that seawater is easily introduced substantially uniformly into the seawater pipes 403 to 408. Further, as described above, since the seawater pipes 40 are arranged in parallel within the outer cylindrical body, the seawater which is fed under pressure from the pressure pump 38 can flow the seawater pipes at a substantially equal pressure and hence there is attained a high total efficiency of hydrogen production. Although in FIG. 2 the parallel pipe unit is constituted by a simple model for the purpose of explanation, no limitation is made thereto. For example, as shown in FIGS. 8 and 9, there may be adopted such parallel configurations as parallel pipe units 42d and 42e, or such factors as sectional shape P, size R, the number Q and position of seawater pipes may be combined arbitrarily. In this embodiment, the size of a seawater pipe indicates the length from the center (central axis X) to a vertex of for example a circumscribed circle of a sectional shape P and the position of the seawater pipe indicates the position of the central axis X for example. In the parallel pipe unit 42d, as shown in FIG. 8, the size R of each seawater pipe 40 is small in comparison with that in FIGS. 2 to 4 and the number Q of pipes is six. In the parallel pipe unit 42e shown in FIG. 9, a large number of seawater pipes are disposed in parallel, whereby a more efficient production of hydrogen can be expected.

In this embodiment, as shown in FIGS. 3 and 4, the second and the third parallel pipe units 42b, 42c are also substantially of the same configuration as the first parallel pipe unit 42a and each includes seawater pipes 403 to 408 which are a regular triangle, a regular pentagon, a regular hexagon, and a regular octagon, respectively, in its sectional shape. The second and the third parallel pipe units 42b and 42c are constituted so as to be different in the layout of seawater pipes 40. In this embodiment, plural parallel pipe units 42a to 42c different in the positions of the seawater pipes 403 to 408 are connected in cascade. In this embodiment, the parallel pipe units are rotated a predetermined angle about a central axis Y of the juxtaposed seawater pipe group i.e. the central axis Y of the outer cylindrical body 44a to change the positions of the seawater pipes. No limitation is made to the construction of this embodiment wherein the positions of the plural seawater pipes 40 in the plural interconnected parallel pipe units are merely changed. The plural parallel pipe units may be constituted so that any or plural factors of sectional shape P, size R, the number Q and position (X) of the seawater pipes are different among the parallel pipe units. Moreover, for example, the parallel pipe units 42a, 42b, 42c shown in FIGS. 2, 3, 4 and the parallel pipe unit 42d shown in FIG. 8 may be connected together.

Figure 5:
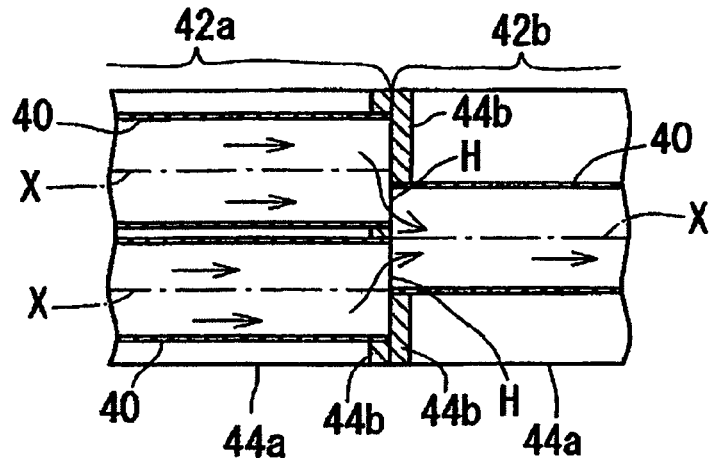
FIG. 5 is an explanatory diagram showing a state of communication and connection in the longitudinal direction of seawater pipes in interconnected parallel pipe units.
Figure 6:
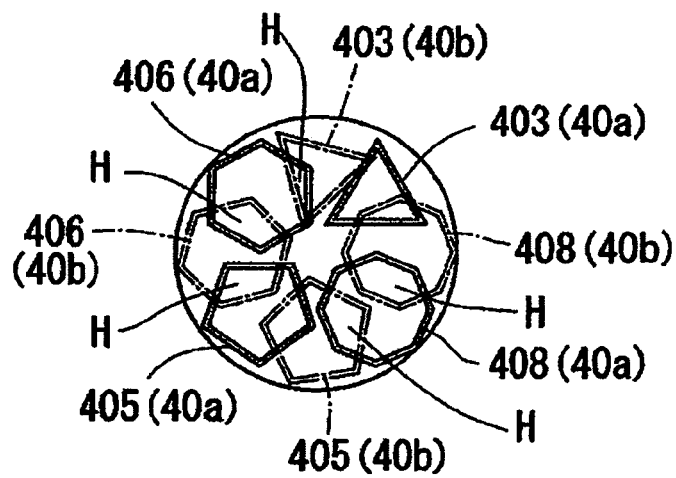
FIG. 6 is a diagram explaining the state of connection between a first parallel pipe unit and a second parallel pipe unit.
Figure 7:
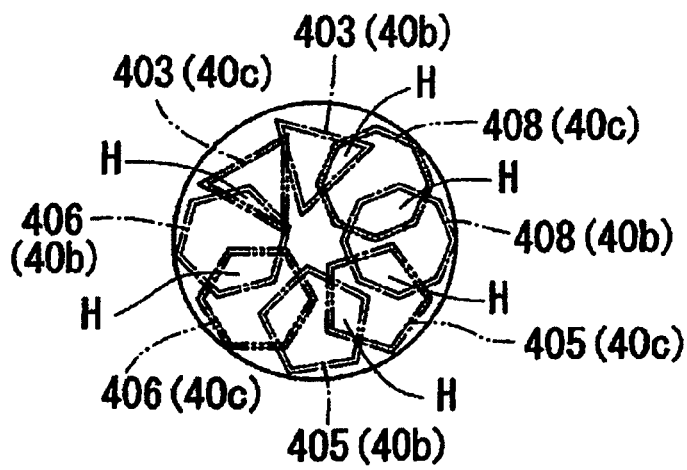
FIG. 7 is a diagram explaining the state of connection between a second parallel pipe unit and a third parallel pipe unit.

Since the cascaded parallel pipe units 42a to 42c are juxtaposed in different positions of the seawater pipes as described above, the seawater pipes arranged in a line are off-center in the respective central axes X as shown in FIGS. 5, 6 and 7. In FIGS. 6 and 7, a solid line represents an end opening of the seawater pipe 40a in the first parallel pipe unit 42a, a dashed-dotted line represents an end opening of the seawater pipe 40b in the second parallel pipe unit 42b, and a dashed-two dotted line represents an end opening of the seawater pipe 40c in the third parallel pipe unit 42c. In this embodiment, as shown in FIGS. 6 and 7, the seawater pipes 40 disposed in a line are positionally deviated at their end openings so as to overlap one another at least partially. They are connected in the longitudinal direction while their interiors are put in communication with one another through only communicating portions H of a small flow path area. In this embodiment, moreover, when parallel pipe units are confronted with each other, the closure lids 44b which support the seawater pipes 40 close the positionally deviated end openings of the pipes 40 in a closely contacted state. That is, the seawater pipes are connected so as to communicate with each other in the longitudinal direction through only their interiors. These pipe interiors are sealed from the exterior. Consequently, it is possible to maintain a satisfactory flowing state of seawater at a high pressure without leakage of the seawater to the exterior of the seawater pipes. In this embodiment, as described above, since the seawater pipes 40 disposed in a line are connected in communication with each other in a mutually deviated state of their central axes X, the pipe portions are partially narrowed at a connected position of the parallel pipe units and the seawater pipes of different sectional shapes (e.g., the seawater pipe 403 of a triangular section and the seawater pipe 406 of a hexagonal section) are connected in communication with each other. Therefore, not only the seawater passing through the duct apparatus flows in a mere flat rectilinear fashion, but also the flow velocity changes due to the flowing path being narrowed halfway or seawater flows plurally through the seawater pipes different in sectional shapes. As a result, it is possible to expect improvement of the hydrogen production efficiency in the entire duct apparatus. The duct apparatus 14 may basically be constituted by only one seawater pipe 40 having a section of any of the shapes of a triangle, a pentagon, a hexagon and an octagon. However, by combining plural seawater pipes of different sectional shapes, the hydrogen production efficiency is improved. Any number, including two, three or more, of the parallel pipe units may be connected together.

As shown in FIG. 1, a separating apparatus 46 is connected to the other end side, i.e., the third parallel pipe unit 42c side, of the duct apparatus 14. The separating apparatus 46 is a separator means for separating and taking out hydrogen, water, salts, etc. from the seawater which has flown into the separating apparatus through the interior of the seawater pipes 40. The hydrogen produced from the seawater within the seawater pipes is separated in the separating apparatus and is recovered and stored in a hydrogen storage tank 48 in a liquid state for example.

Next, the operation of the hydrogen producing system using seawater according to this embodiment will now be described together with the hydrogen producing method according to the present invention. With the drain port 22 closed, seawater as a starting material is introduced from the inlet port 20 into the sealed tank 16 in the activating apparatus 12. Then, with the opening/closing valve in the inlet port closed, the seawater is activated while injecting at for example 230° C., 25 atm. steam into the sealed space S through the steam injection device 18 and while maintaining the interior of the sealed space S at a high temperature and a high pressure. At this time, the steam is jetted so as to agitate the seawater. Then, for example, after the activating treatment for about one hour, the drain port 22 is opened and the activate seawater of high temperature and high pressure is allowed to flow in a state of high pressure through the seawater pipes 403 to 408 in the duct apparatus 14 via the pressure feed mechanism 34. In this case, it is presumed that when the activated seawater flows through the seawater pipes 40 in the duct apparatus 14, the water molecule contained in the seawater undergoes high energy developed locally (e.g., ultra-high temperature and pressure reaction) and hydrogen is separated and produced. The mechanism of this hydrogen production in the seawater pipes has not actually been made clear, but it is presumed that hydrogen is produced from water by one or a complicated combination of various phenomena and reactions such as, for example, the generation of ultra-high temperature and pressure resulting from formation and collapse of fine air bubbles such as cavitations in the pipes, a direct thermal separation reaction of hydrogen from the water molecule, a chemical reaction of water and other radicals, a redox reaction of mineral components such as sodium, calcium and iron, chlorine and other components contained in the activated seawater, and a neutrino reaction proposed by Takao which will be described later. For example, as to a radical reaction of the water molecule, it is presumed that hydrogen is produced in accordance with the reactions of following formulae:

[Formula 3]

$$H_2O \rightarrow H\bullet + OH\bullet \quad (1)$$

$$2H\bullet \rightarrow H_2 \quad (2)$$

As to other detailed radical reactions, reference thereto is here omitted. As to neutrino excited atomic radical and neutrino morphological wave resonance, it is presumed that neutrino (ν) and antineutrino (ν*) are developed within a seawater pipe as shown in the following formulae and the thus-developed neutrino (ν, ν*) reacts with the water molecule to produce hydrogen:

[Formula 4]

$$0 \rightarrow \nu + \nu^* \quad (3)$$

$$\nu + H_2O \rightarrow H\bullet + OH\bullet + \nu \quad (4)$$

$$\nu + H_2O \rightarrow H_2 + O\bullet + \nu \quad (5)$$

$$\nu + H_2O \rightarrow H_2 + F\bullet + e^- \quad (6)$$

$$\nu^* + H_2O \rightarrow H_2 + N\bullet + e^+ \quad (7)$$

$$e^- + e^+ \gamma ray \quad (8)$$

$$H_2O + \gamma ray \rightarrow H\bullet + OH\bullet \quad (9)$$

$$2H\bullet \rightarrow H_2 \quad (10)$$

In the above formulae, $e^-$ stands for electron and $e^+$ stands for positron. Generally, neutrino is known as usually being built at a time of for example nuclear fusion, fission, the other nuclear reactions, or elementary particle reactions, and as a fine particle without an electric charge and having only a weak interaction with thus rarely reacting with other substances. On the other hand, neutrino (ν) is known for reacting with a nucleus (neutron) resulting in a nuclear transformation or the like as in formulae (11) and (12) below.

[Formula 5]

$$\nu + {}_{17}Cl \rightarrow {}_{18}Ar + e^- \quad (11)$$

$$\nu + n \rightarrow p + e^- \quad (12)$$

Here, n is a neutron, p is a proton, and $e^-$ is an electron. It is presumed that neutrino induces such reactions as the above formulae (3) to (10) and relates to the production of hydrogen from water.

Further, as shown in FIGS. 2 to 4, the duct apparatus is constituted by connecting the parallel pipe units which are different in the layout of the seawater pipes, therefore, as shown in FIG. 5, the flow velocity of the seawater flowing through the seawater pipes in the duct apparatus changes at an intermediate position and the seawater flows through plural seawater pipes of different sectional shapes. Therefore, it is presumed that the reactions of hydrogen generation as described above are promoted. It is also presumed that various substances contained as seawater components activated in the activating apparatus, such as sodium, calcium, iron and chlorine, react with other radicals (e.g., OH• and electrons) than H• and that consequently such a reverse reaction as the following formula (13) decreases and hydrogen producing reactions (e.g., the above formulae (2) and (10)) are promoted:

[Formula 6]

$$H\bullet + OH\bullet \rightarrow H_2O \quad (13)$$

It is further presumed that high energy is created locally by allowing seawater to flow through the seawater pipes 40 in the duct apparatus 14, with consequent atomic transmutation of components contained in the seawater as in the activating apparatus. Therefore, it is possible to obtain further modified seawater. Also as to a cluster of water molecules contained in seawater, a small cluster of the order of nano ($10^{-9}$) to pico ($10^{-12}$) is expected to be formed. The hydrogen producing system of this embodiment can expect production of a large amount of hydrogen directly from seawater, so by loading it onto a large-sized ship, e.g., a large-sized tanker, sailing the oceans, hydrogen fuel can be produced constantly from seawater. Thus, the hydrogen producing system of this embodiment is superior in point of long-term sailing and mass transit of goods. Likewise, even if the hydrogen producing system of this embodiment is installed in seaside cities, seaside industrial areas, islands or ocean plants, it is possible to attain an effective utilization of energy. Additionally, the hydrogen producing system in question is superior also in point of environment because the waste associated with the production of hydrogen is a clean one.

The hydrogen producing system and method using seawater according to the present invention described above are not limited to the above embodiments and modifications, but changes may be made within the scope not departing from the essence of the present invention described in the scope of claims.

INDUSTRIAL APPLICABILITY

The hydrogen producing system and method using seawater according to the present invention are suitably applicable to the industrial production of hydrogen used in a wide variety of fields, including hydrogen-fuel cells and various industries. Particularly, if the hydrogen producing system according to the present invention is installed together with a power source using hydrogen as fuel on a large-sized tanker or the like sailing the oceans, there accrues an advantage in point of refueling. Likewise, even if it is installed in seaside cities, seaside industrial areas, islands or ocean plants, it is possible to attain an effective utilization of energy.

The invention claimed is:

1. A hydrogen producing system, comprising:
   a seawater activating apparatus for activating seawater present within a sealed space at a high temperature and a high pressure using energy provided from high-temperature, high-pressure steam injected into the sealed space and for draining activated high-temperature, high-pressure seawater from said activating apparatus, said seawater activating apparatus having:
       a sealed tank having sealed space for admitting seawater therein,
       an inlet port for introducing seawater into the sealed space,
       a drain port for draining the activated high-temperature, high-pressure seawater, and
       steam injection means for injection of high-temperature, high-pressure steam into said sealed space;
   a pressure feed means for feeding the activated high-temperature, high-pressure seawater drained from the drain port;
   a duct apparatus for producing hydrogen from the activated high-temperature, high-pressure seawater fed by the pressure feed means by receiving and passing the activated high-temperature, high-pressure seawater fed by the pressure feed means, said duct apparatus including at least one seawater pipe, each seawater pipe of said at least one seawater pipe having a section of any of the shapes of triangle, pentagon, hexagon, and octagon; and
   a separating apparatus that is structured and arranged to separate hydrogen produced in the duct apparatus from seawater introduced into the separating apparatus through the interior of the at least one seawater pipe.

2. The hydrogen producing system according to claim 1, wherein the at least one seawater pipe constitutes a parallel pipe unit in which plural seawater pipes are arranged and supported in parallel through supporting means so that longitudinal axes of the plural seawater pipes are parallel to each other and ends of each of the plural seawater pipes are flush with each other.

3. The hydrogen producing system according to claim 2, wherein plural parallel pipe units differ in at least one of sectional shape, size, number, and position of said seawater pipes and are connected in cascade so that seawater pipes, arranged in a line, are in longitudinal communication with each other in a state in which the interiors of said seawater pipes are sealed from the exterior.

4. The hydrogen producing system according to claim 3, wherein each of said seawater pipes has a respective central axis and said seawater pipes are connected in longitudinal communication with each other in a state in which the respective central axes of said seawater pipes are off-center from each other.

5. The hydrogen producing system according to claim 1 further comprising a hydrogen storage means for storing the hydrogen separated in the separating apparatus.

6. The hydrogen producing system according to claim 1, wherein the activated high-temperature, high-pressure seawater fed by the pressure feed means passing through the duct apparatus flows with a changed flow velocity due to the flowing path being narrowed halfway or flows through plural seawater pipes having different sectional shapes.

* * * * *